(12) United States Patent
Shires

(10) Patent No.: US 6,792,102 B2
(45) Date of Patent: Sep. 14, 2004

(54) MATCHING ROUTED CALL TO AGENT WORKSTATION

(75) Inventor: Glen E. Shires, Danville, CA (US)

(73) Assignee: Intel Corporation, Santa Clara, CA (US)

( * ) Notice: Subject to any disclaimer, the term of this patent is extended or adjusted under 35 U.S.C. 154(b) by 278 days.

(21) Appl. No.: 09/750,030

(22) Filed: Dec. 29, 2000

(65) Prior Publication Data

US 2002/0085705 A1 Jul. 4, 2002

(51) Int. Cl.⁷ .................................................. H04M 3/00
(52) U.S. Cl. ............................. 379/265.04; 379/265.09
(58) Field of Search ...................... 279/265.01, 265.04, 279/265.09

(56) References Cited

U.S. PATENT DOCUMENTS 5,884,032 A * 3/1999 Bateman et al. ............ 709/204
6,049,602 A * 4/2000 Foladare et al. ......... 379/265.04

* cited by examiner

Primary Examiner—Ahmad F. Matar
Assistant Examiner—Quynh H. Nguyen
(74) Attorney, Agent, or Firm—Blakely, Sokoloff, Taylor & Zafman LLP

(57) ABSTRACT

An arrangement is provided for matching a routed call to an agent workstation. An agent working at an agent station of a call center enters an agent ID when the agent answers a routed call. The routed call is therefore associated with the agent ID. The agent ID is encoded into DTMF tones which is detected by a telephony server so that the encoded agent ID can be extracted. The extracted agent ID is then sent to a browser server. The agent ID is then used by the browser server to identify a workstation that is represented by the same agent ID by matching the received agent ID with the workstation.

33 Claims, 13 Drawing Sheets

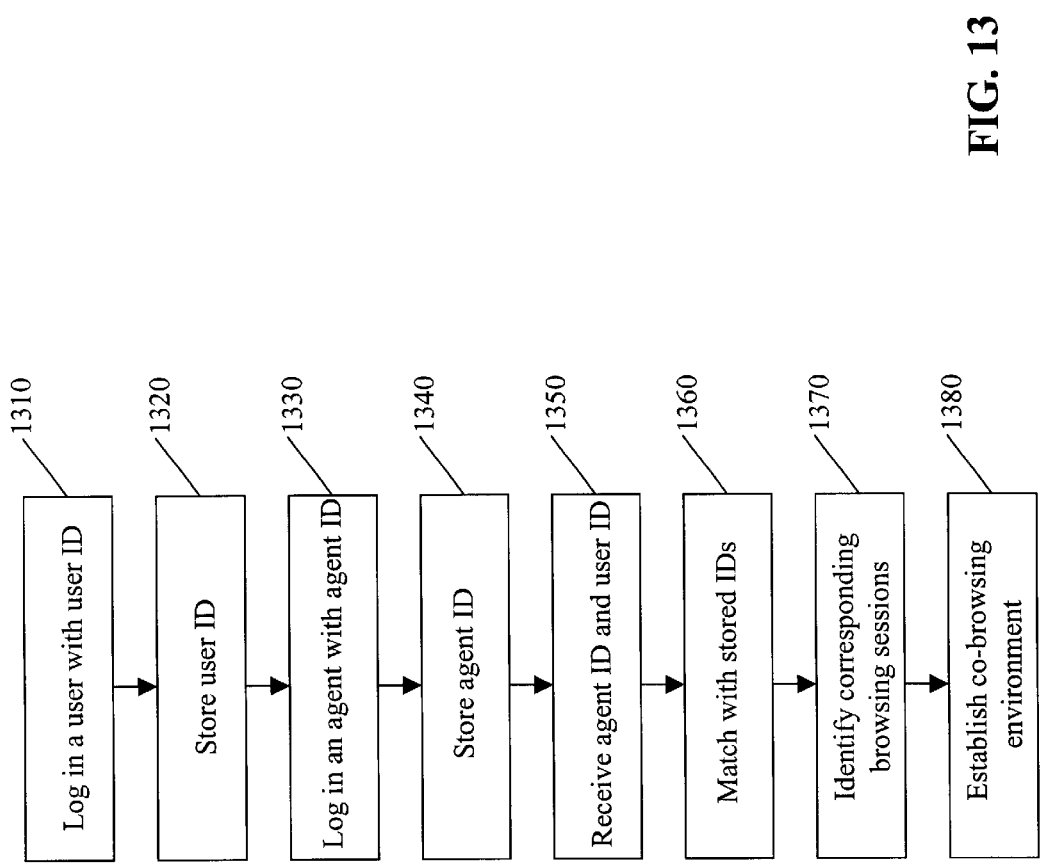

MATCHING ROUTED CALL TO AGENT WORKSTATION

APPLICATION DATA

Three patent applications are being filed simultaneously that relate to various aspects of live customer support via a call center. The three patent applications are entitled "Data Integration With Interactive Voice Response Systems", "Automatic Detecting When An Agent Is Available", and "Matching Routed Call To Agent Workstation". The subject matter of each is hereby incorporated by reference into each of the others.

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

1. Field of the Invention

Aspects of the present invention relate to the field of telephone information services and customer support. Other aspects of the present invention relate to a method to live customer support via a call center.

2. General Background and Related Art

In today's highly competitive market, the quality of customer support often provides a competitive advantage to products and the companies that produce the products. Measures used to quantify the quality of customer support may include the responsiveness of customer support personnel and the skill of the representatives or agents who interact with the customer. Responsiveness may be measured by how long it takes for a customer to receive the customer support. Skill of customer support personnel may be measured by how effectively the problem of a customer, that requires customer support, is resolved.

To offer quality customer support, many companies provide call centers which customers may call with questions. These call centers are staffed by agents who help customers during phone conversations. Responsiveness is an indicator of how long a customer has to wait 'on hold' until getting to talk to an agent. Skill can be evaluated based on how many times a customer has to call to resolve the problem. The number of times needed may be attributed to the agent assigned to handle the customer's problems. That is, depending on the nature of the problem, agents with different skills are assigned to handle different categories of problems.

To improve the level of skill, a call center may be designed so as to utilize an effective interactive voice response system which prompts a customer, who calls for support, to answer various predetermined questions by making touch-tone responses on the phone. If these screening questions are carefully designed, they can identify the nature of the problem and help the customer get to agent with the appropriate skills and authority to effectively handle the customer's problem.

The responsiveness of a call center is related, at least in part, to the capacity of the call center and the volume of calls. When a call center has too few agents to provide customer support, a customer who calls for help may have to wait a long time until the call is answered by the next available agent. Of course, increasing the number of agents leads to increased cost, including salaries, training and other overhead.

An alternative approach to improving the responsiveness of a call center is to introduce an automated call-back mechanism. Instead of requiring a calling customer to wait in line for an agent to answer the call, an interactive voice response system may be designed to monitor the call center (e.g., the number of customers currently waiting in line and the approximate number of minutes until the calling customer may be answered) and to offer a calling customer the opportunity to choose a call-back option. If the calling customer chooses the call-back option (instead of waiting), the customer is prompted to provide additional information including call-back phone number where the customer can be reached. The entered call-back phone number may then be stored in a queue at the call center, together with other information characterizing the request for help. This other information may specify the nature of the problem and the customer account number. This information can be retrieved later and used by an agent, selected based on the specified problem, to return the customer's call.

Another recently emerged customer service feature, is to allow a customer to activate a phone call to a call center via an Internet web page. Live customer support offered by a call center may be accessed by clicking a button on a web page. When a customer clicks on the button, a phone call is initiated to the call center that supports the customer service. Currently implemented systems that facilitate such a feature do not forward relevant web-data, which may include information such as customer account number and the specification of the problem, to the call center.

Most of the call centers operating today do not have an automated call-back capability. Even though it would improve the quality of customer support by converting existing call centers that do not possess such capabilities to systems that support such capabilities, the conversion may require substantial investment and at the same time, cause disruption of the service provided by the original call center. Integrating existing call centers with web capabilities usually leads to the same consequences. It is beneficial to introduce new technologies that utilize existing call center systems and add new capabilities, such as web activation capability and automated call-back capability, to the existing call centers without introducing any disruption to the systems that are currently in operation.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein:

FIG. 13 is an exemplary flowchart for a browser server.

DETAILED DESCRIPTION

Figure 1:
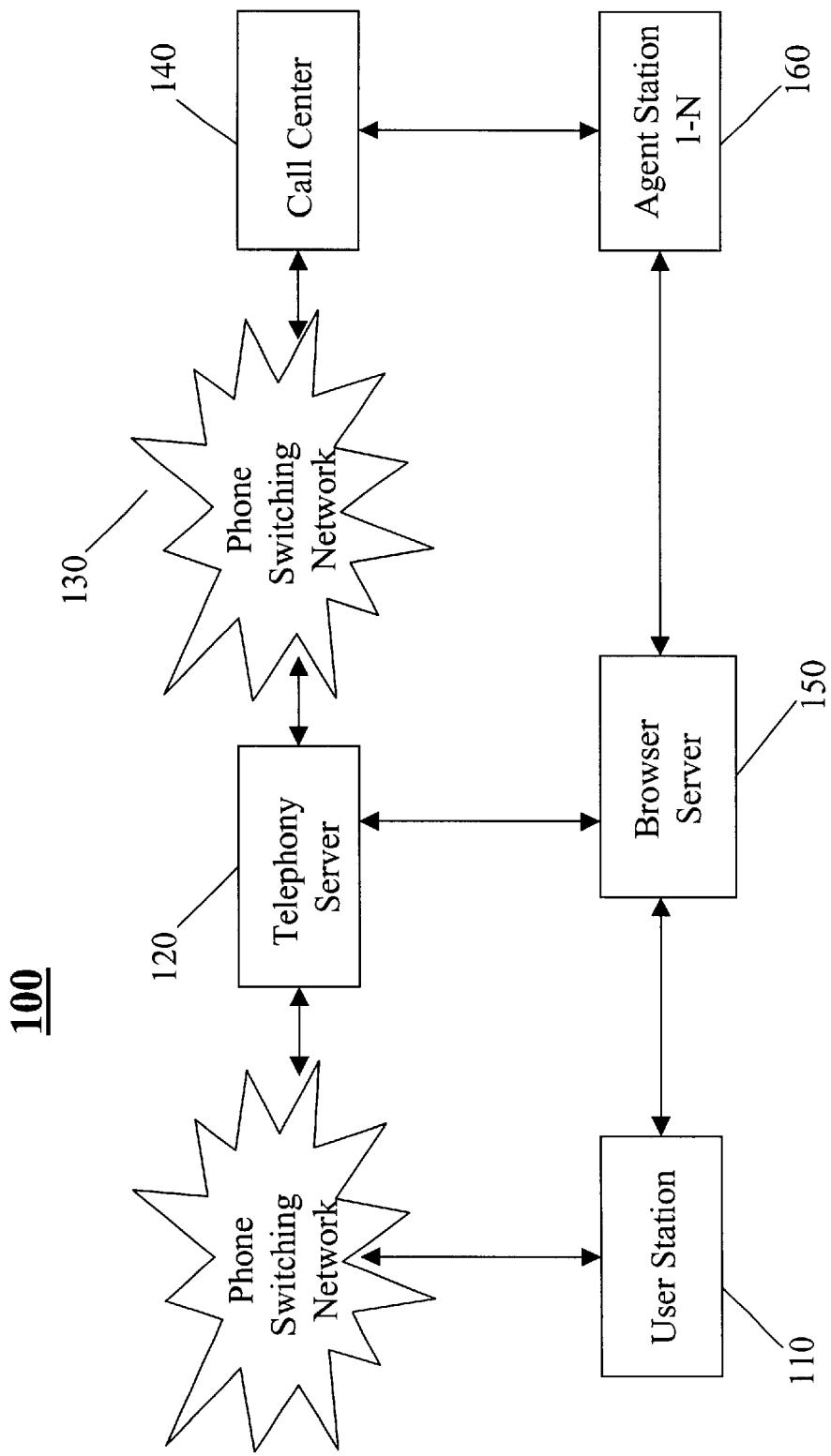
FIG. 1 is a high level block diagram of a live customer support system via a telephony server.

FIG. 1 is a high level block diagram of a system 100, in which a telephony server, connects a customer, via a browser server, with a call center, to facilitate web activation and automated call-back capabilities. The system is particularly applicable for use with an existing call center that does not possess the web activation and automated call-back capabilities. System 100 includes a user station 110, a browser server 150, a telephony server 120, a phone switching network 130, and an agent station 1–N 160. The Telephony server 120 takes a customer request for live customer support (e.g., request for a call-back), issued by a user at the user station 110 via a web page on the browser server 150 and converts the web request into a conventional phone call to the call center 140, via the phone switching network 130. During the conversion, the Telephony server 120 encodes the web information that is necessary for the call center 140 to execute the requested call-back according to the criteria adopted by an interactive voice response system in the call center 140 so that the encoded results act the same way, in the call center 140, as a conventional customer phone call.

When the call center 140 receives the encoded information, it acts as a conventional call center, selecting an appropriate agent and routing the request to the selected agent. When the agent answers the routed call on a, for example, touch-tone phone, the Telephony server 120 detects the availability of the agent and then automatically connects the agent with the customer who issues the web request for live customer support. System 100 addresses the aspects of matching a routed call, initiated from a call-back request issued by a user via a web page and routed to an agent at an agent station in a call center, with a workstation of the agent.

Figure 2:
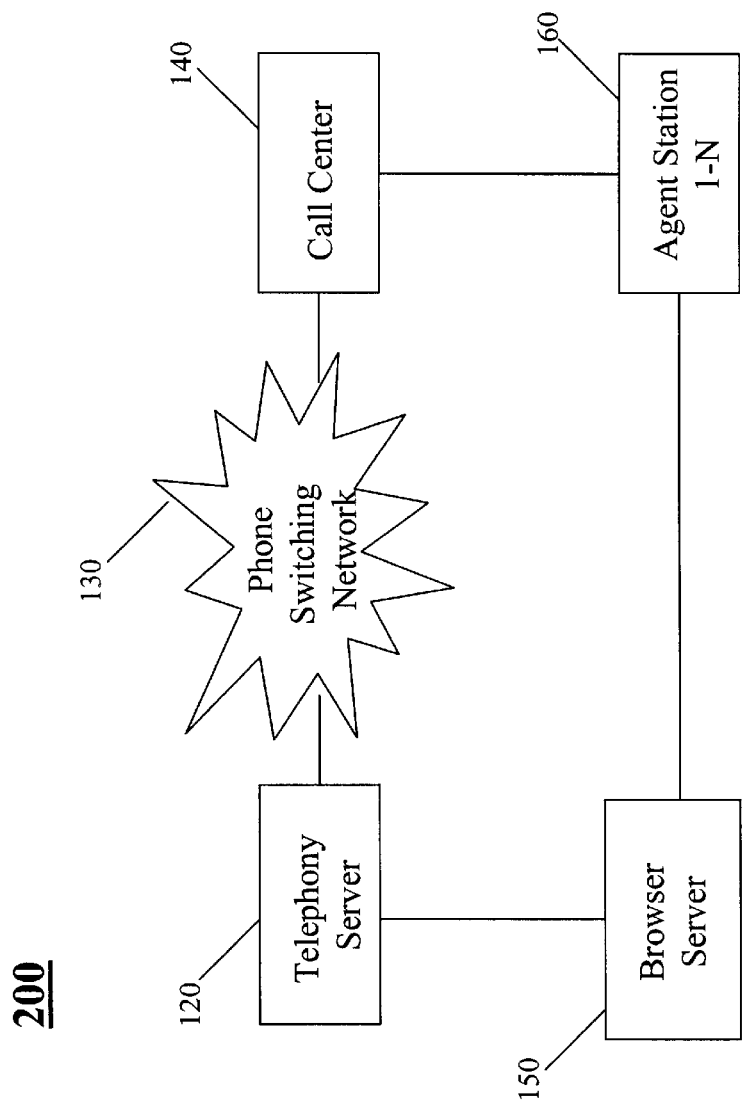
FIG. 2 shows a high level block diagram of an exemplary embodiment of the invention, in which a routed call is matched with a workstation.

FIG. 2 is a high level block diagram of an exemplary embodiment of the invention, in which a routed call, representing a call-back request from a user, is matched with a workstation of an agent who answers the routed call. System 200 includes the browser server 150, the Telephony server 120, the phone switching network 130, the call center 140, and the agent station 1 through N 160. An agent at the agent station 160 logs onto, using an agent ID, a web page via browser server 150. The browser server 150 records the agent ID and makes an association between the agent ID and the workstation from which the agent logs onto the browser server 150. A user (not shown in FIG. 2) may issue a call-back request for live customer support via the browser server 150. The user may log onto the s browser server 150 using a user ID. Similarly, the user ID is recorded and is associated with, by the browser server 150, the device from where the user logs onto the browser server 150.

The user's web request for a call-back is received by the Telephony server 120 and is forwarded, via the phone switching network 130, to the call center 140. The call center 140 then routes the call-back request to an appropriate agent at the agent station 160. When the agent answers the routed call, the agent enters an agent ID via Dual Touch-tone Multi Frequency (DTMF) tones which is routed, in a reverse direction, by the call center 140 through the phone switching network 130.

The Telephony server 120 detects the DTMF tones and extract the agent ID encoded in the DTMF tones. The Telephony server 120 identifies the corresponding call-back request, which may be queued in the Telephony server 120, and connects the extracted agent ID with the user ID associated with the call-back request. The Telephony server 120 sends both the agent ID and the user ID to the browser server 150 so that the browser server 150 may establish a co-browsing session between the agent and the user. The Telephony server 120 then also bridges a phone call between the agent at the agent station 160 and the user for the call-back.

To facilitate live customer support, the Telephony server 120 may implement a button on the web site representing live customer support so that a customer can request live customer support by simply clicking on the button from the web site. With live customer support, a customer may request an agent at the agent station 160, connected to the call center 140, to call back a specific phone number. The request, issued via a web page, is sent to the Telephony server 120 from the browser server 150.

Upon receiving the call-back request, the Telephony server 120 converts the web request into an appropriate phone call that encodes the relevant information necessary for executing the call-back and then places the phone call, via the phone switching network 130, to the call center 140. At the same time, the Telephony server 120 may store the request and the relevant information (e.g., call-back phone number) in a storage. The stored request may be later retrieved, when an agent is available to handle a call-back request, from the storage and used to automatically execute the requested call-back.

The call center 140 receives a phone call representing a call-back request, automatically generated by the Telephony server 120, and selects accordingly an agent on one of the connected agent stations 1–N 160. The selection may be performed based on the relevant information provided with the request. Such information may include the nature of the problem (e.g., billing problem) so that the call center 140 may use such information to determine the appropriate agent to be selected. For example, if the customer who requests live customer support has problems with billing statement, the selected agent should possess the skills related to billing problems. The call center 140 then routes the call-back request to the selected agent.

When the selected agent answers the routed call, the agent enters an agent ID at the agent station 160. The entered agent ID may correspond to the agent ID used for the same agent to log onto the browser server 150 at the corresponding workstation. The agent ID associated with the answer to the routed call may be transmitted as DTMF tones through the call center 140 as well as the phone switching network 130. The Telephony server 120 detects, on the other end of the phone switching network 130, the DTMF tones and decodes the DTMF tones to extract the agent ID that identifies the agent who is currently available to handle a call-back request.

Once the Telephony server 120 detects the available agent, it associates the agent to the corresponding call-back request and automatically bridges the phone call-back between the agent at the agent station 160 and the user who issued the call-back request. At the same time, the Telephony server 120 may also connects the user and the agent through the browser server 150. To facilitate such connection via the browser server 150, the Telephony server 120 retrieves the user ID associated with the call-back request and sends it, together with the agent ID, extracted from the DTMF tones, to the browser server 150.

Upon receiving an agent ID, entered by the agent who answers the routed call, and the user ID who initiated the routed call, the browser server 150 may match them with the IDs that have been stored in the browser server 150, representing the browser users who have logged onto the browser server 150. The matching yields two corresponding web users of the browser server 150. One is the customer who issued the call-back request via the browser server 150, identified by matching the user ID sent by the Telephony server 120 with the user ID stored by the browsing server 150 when the customer logs onto the browsing server 150. Another web user is the agent who answers the routed call, identified by matching the agent ID sent from the Telephony server 120 with the agent ID stored in the browsing server 150 which is entered by the agent, typically when the agent logs onto the browsing server 150, prior to answering the routed call.

Once the two web users are matched, the browser server 150 connects the two web users by opening a co-browsing session, in which both web users may push content through to the display screen of the other web user. In system 200, a call-back request may be answered by connecting the customer and the agent via both a phone line and shared web pages. The user may also specify the preferred way of making the call-back. The Telephony server 120 may be designed accordingly to handle different types of call-back based on customers' specified preference.

Figure 3:
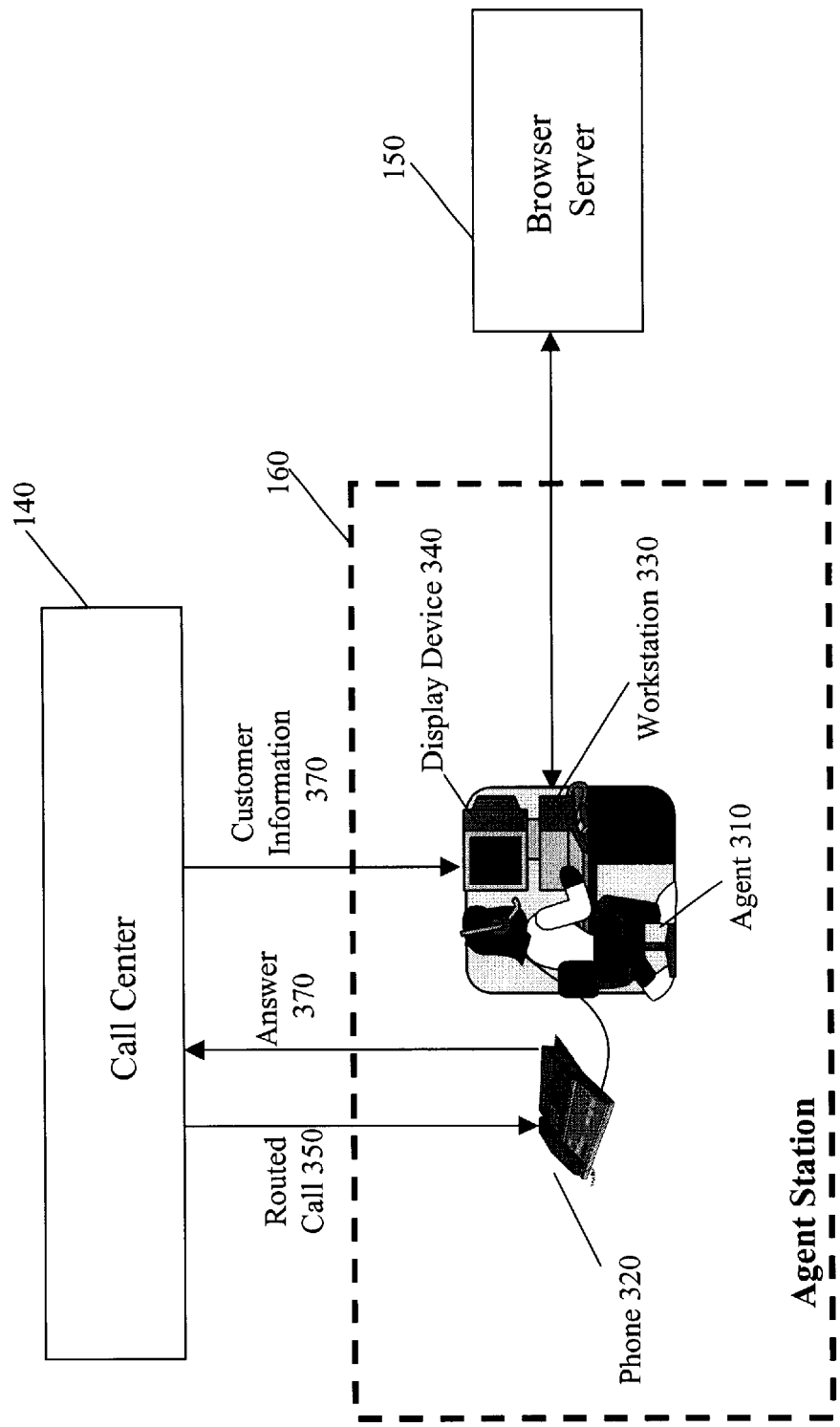
FIG. 3 shows an exemplary configuration of an agent station.

FIG. 3 is shows the configuration of an exemplary agent station 160. The agent station 160 connects to the call center 140 and includes an agent 310, a phone 320, a workstation 330, and a display device 340 associated with the workstation 330. The workstation 330 is capable of connecting to the Internet via either wired or wireless connection. Through the workstation 330, the agent 310 may be able to log onto a web site, through the browser server 150. The phone 320 in FIG. 3 may include a touch-tone phone connected to the call center 140.

A call-back request for live customer support is routed to the agent station 160 in the form of a routed call 350 by the call center 140. The relevant customer information 360, supplied by a user together with the call-back request, may be simultaneously sent to the agent station 160. When the routed call 350 reaches the phone 320, it rings. The customer information 550 related to the requested call-back (e.g., customer account number) may also be sent from the call center 140 to the display device 340 of the workstation 330. When the routed call 350 reaches the agent station, the agent answers the call via the phone 320 to generate an answer 370.

Figure 4:
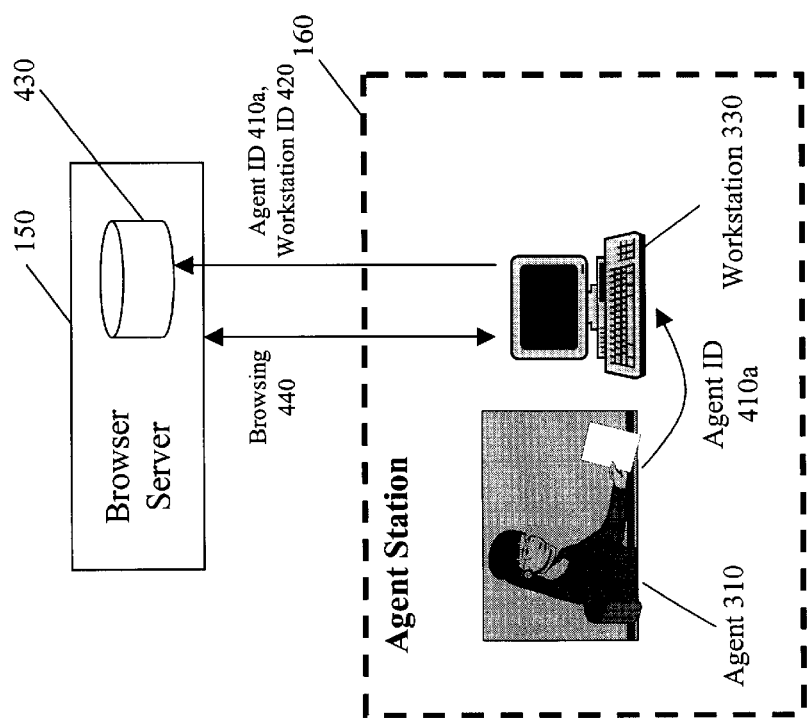
FIG. 4 shows an exemplary login process, in which an agent uses an agent ID to log onto a browser server.

FIG. 4 shows schematically what happens when agent 310 logs onto the browser server 150 from the corresponding workstation 330. The agent 310 enters the agent ID 410a from the workstation 330, which enables the browser server 150 to not only identify the identity of the agent 310 but also the identity of the workstation 330. The browser server 150 records the agent ID 410a and its associated workstation ID 420 in storage 430. Once the login process is completed, the browsing 440 starts between the agent and the browser server 150.

Figure 5:
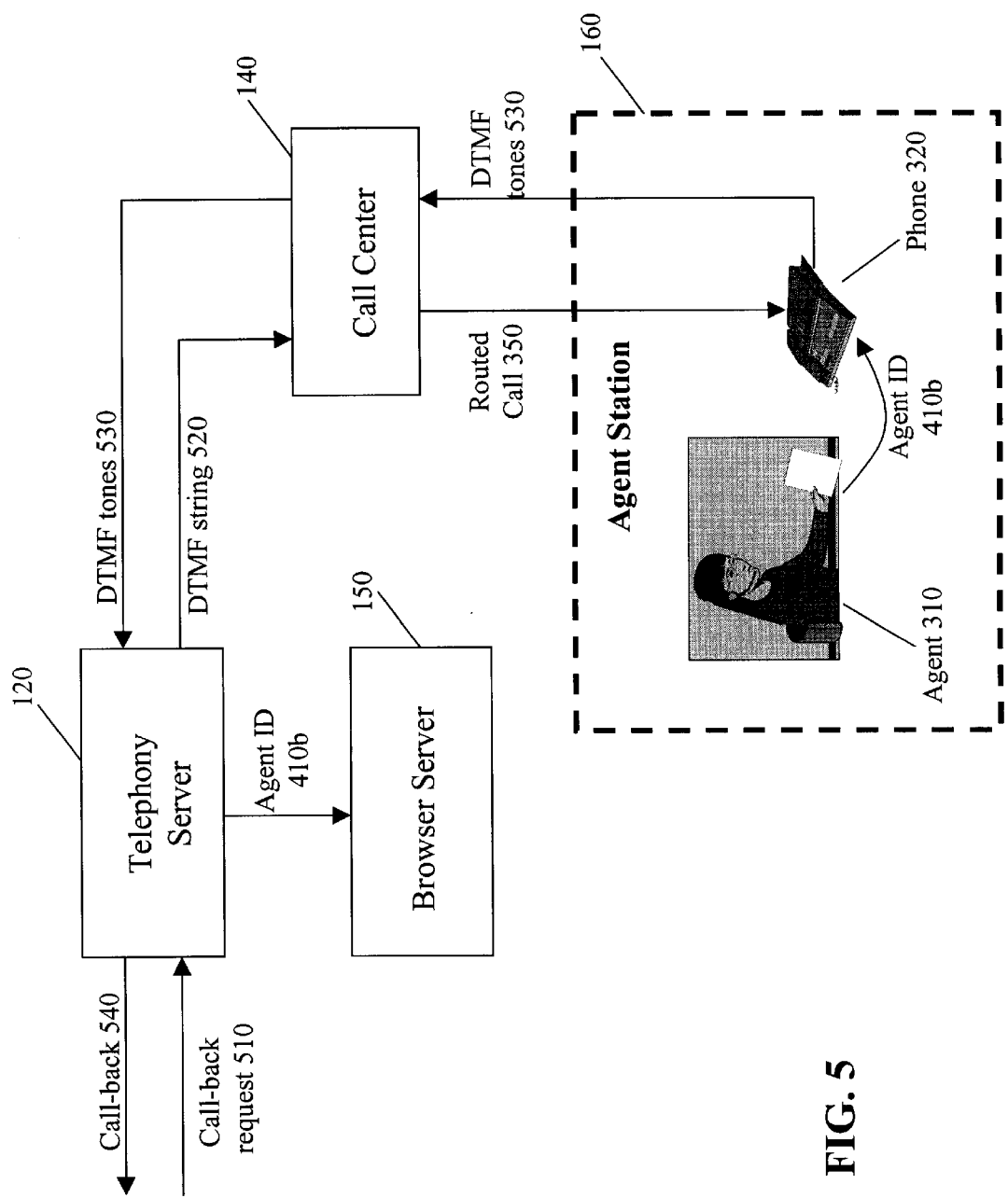
FIG. 5 shows a block diagram with data flow, in which an agent ID, entered when an agent answers a routed call, is sent to a browser server.

FIG. 5 shows how the agent ID 410b is entered into the browser server 150 when the agent 310 answers a routed call via the phone 320. A call-back request 510 is forwarded, through the Telephony server 120, to the call center 140. The routed call 350 is placed from the call center 140 to the phone 320 at the agent station 160. When the agent 310 is available, the agent 310 picks up the phone 320 and enters the corresponding agent ID 410b via the keys on the phone 320. If the phone 320 is a touch-tone phone, the entered agent ID 410b generates DTMF tones 530 which is sent to the call center 140 and further transmitted to the Telephony server 120, via, for example, the phone switching network 130. When the Telephony server 120 receives the DTMF tones, it decodes the DTMF tones 530 to extract the agent ID 410b and sends the agent ID 410b to the browser server 150.

Figure 6:
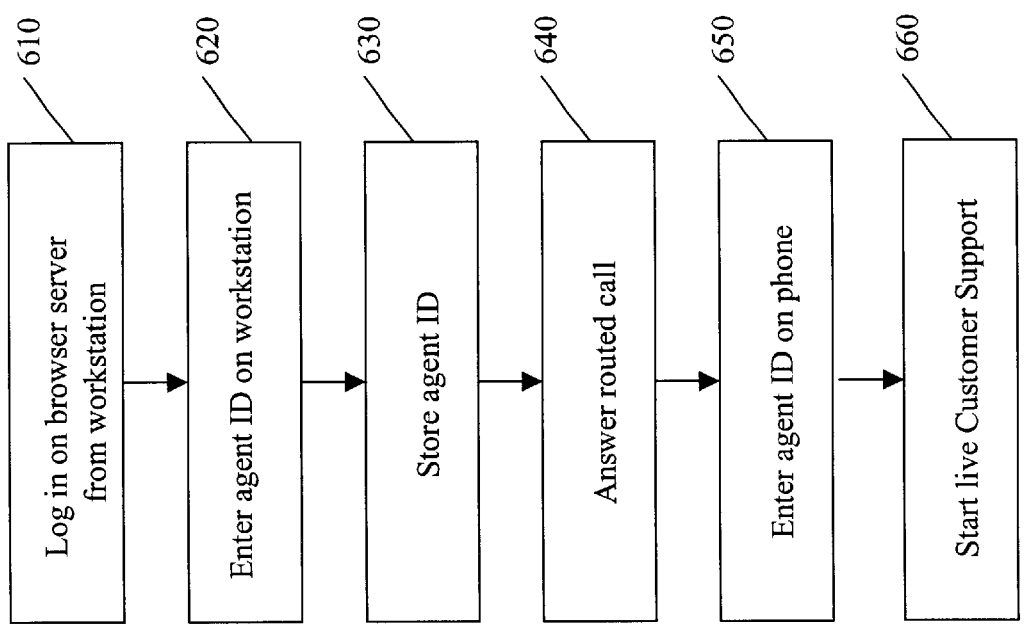
FIG. 6 is an exemplary flowchart for the process of extracting an agent ID of the agent who answers a routed call.

FIG. 6 is a flowchart of an exemplary process for agent 310. The agent 310 logs onto the browser server 150 from a workstation 330 at act 610. During the login, the agent 310 enters, at act 620, the corresponding agent ID 410a from the workstation 330. The browser server 150 stores, at act 630, the agent ID 410a, in an ID storage 430, together with the workstation ID 420.

When the same agent 310 answers a routed call at act 640, the agent enters, at act 650, the corresponding agent ID 410b from the keyboard of the phone 320 at the agent station 160. The agent ID 410b is encoded into DTMF tones 530 and sent to the call center 140 and further transmitted, via the phone switching network 130, to the Telephony server 120. The Telephony server 120 then automatically bridges a call-back between the agent 310 and the customer who issued the call-back request. At act 660, the agent 310 starts the live customer support requested by the user. The live customer support may comprise both a phone call-back and a co-browsing session between the agent 310 and the user.

Figure 7:
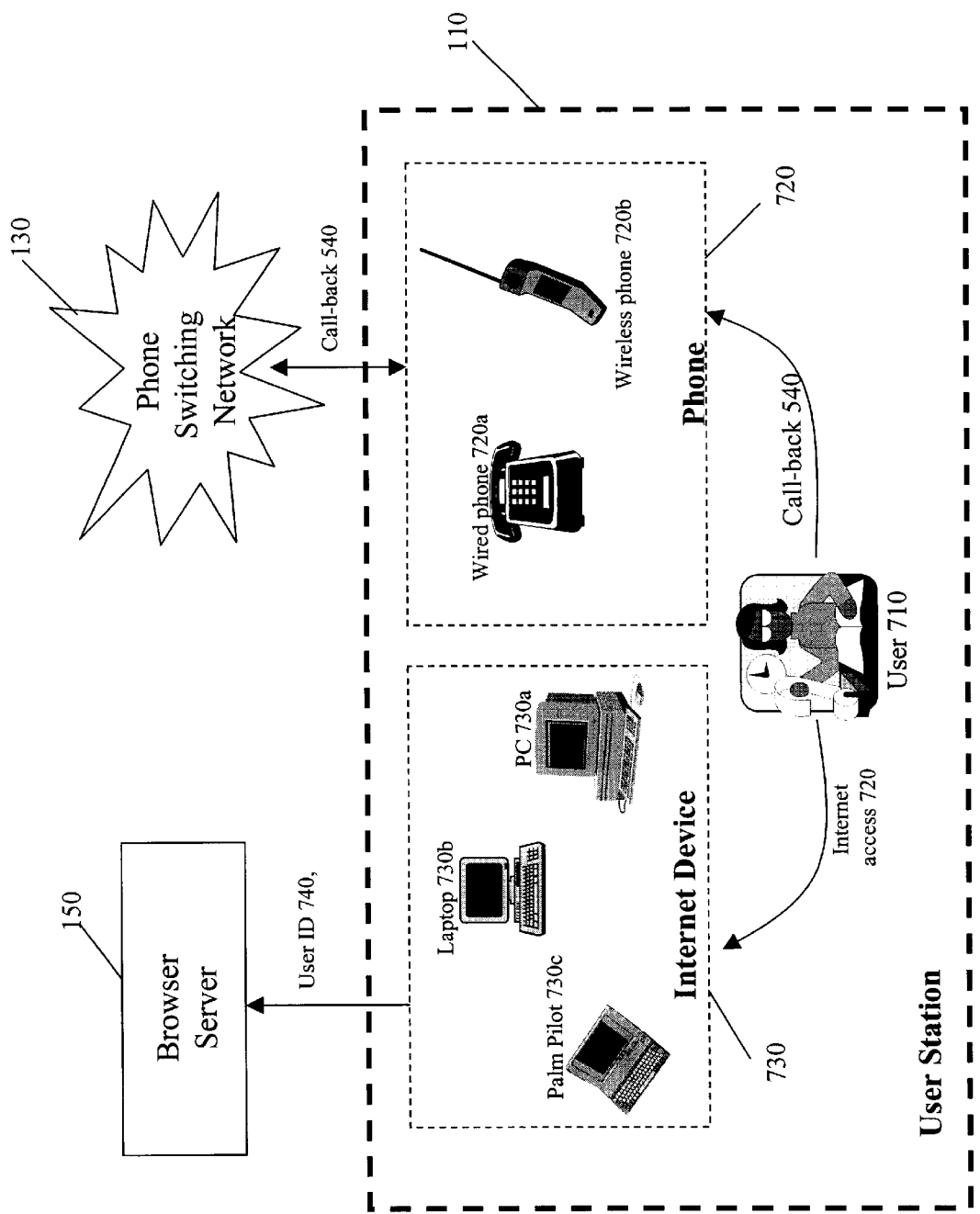
FIG. 7 shows an exemplary configuration of a user station.

To automatically bridge a phone call-back and create a co-browsing session between a user who initiates a call-back request and an agent who answers the routed call issued based on the call-back request, the user may be required to be connected to both the phone and the Internet. FIG. 7 shows an exemplary configuration of a user station 110.

The user station 110 includes a user 710, an Internet device 730, and a phone 720. The Internet device 730 is a device that is capable of connecting to the Internet via a connection, in either wired or wireless fashion. Examples of such a device include a person computer 730a, a laptop 730b, or a Palm Pilot 730c. The user 710 may log onto the browser server 150 through the Internet device 730. The user 710 provides a user ID 740 during the login. The user ID 740 may be stored by the browser server 150 and associate it with a browsing session. Through the browser server 150, the user 710 may browse a web page and issue a call-back request on the web page.

The phone 720 may include a wired phone 720a or a wireless phone 720b. A wireless phone may be a cordless phone or a cellular phone. The user 710 may use the phone 720 to receive a call-back, via the phone switch network 130, to receive live customer support. The phone switching network 130 may be a conventional Public Switched Telephone Network (PSTN) or a wireless communication network.

When the user 710 chooses, via a web page, live customer support by clicking on a button corresponding to live customer support selection, the user 710 may be prompted to provide more relevant information, on the web page, that is necessary to complete the requested customer support. Such relevant information may include account number, specification about the nature of the problem, and the phone number to be used for the callback. Once such information is collected, the user 710 may click a submit button so that a call-back request 510, including the provided relevant information, may be sent out from the browser server 150 to the Telephony server 120.

After the call-back request 510 is issued, the user 710 does not have to wait on-line for the call-back 540. In system 200, the call-back 540 is implemented as a phone call from an agent at the agent station 160, placed automatically to the user 710 by the Telephony server 120.

Figure 8:
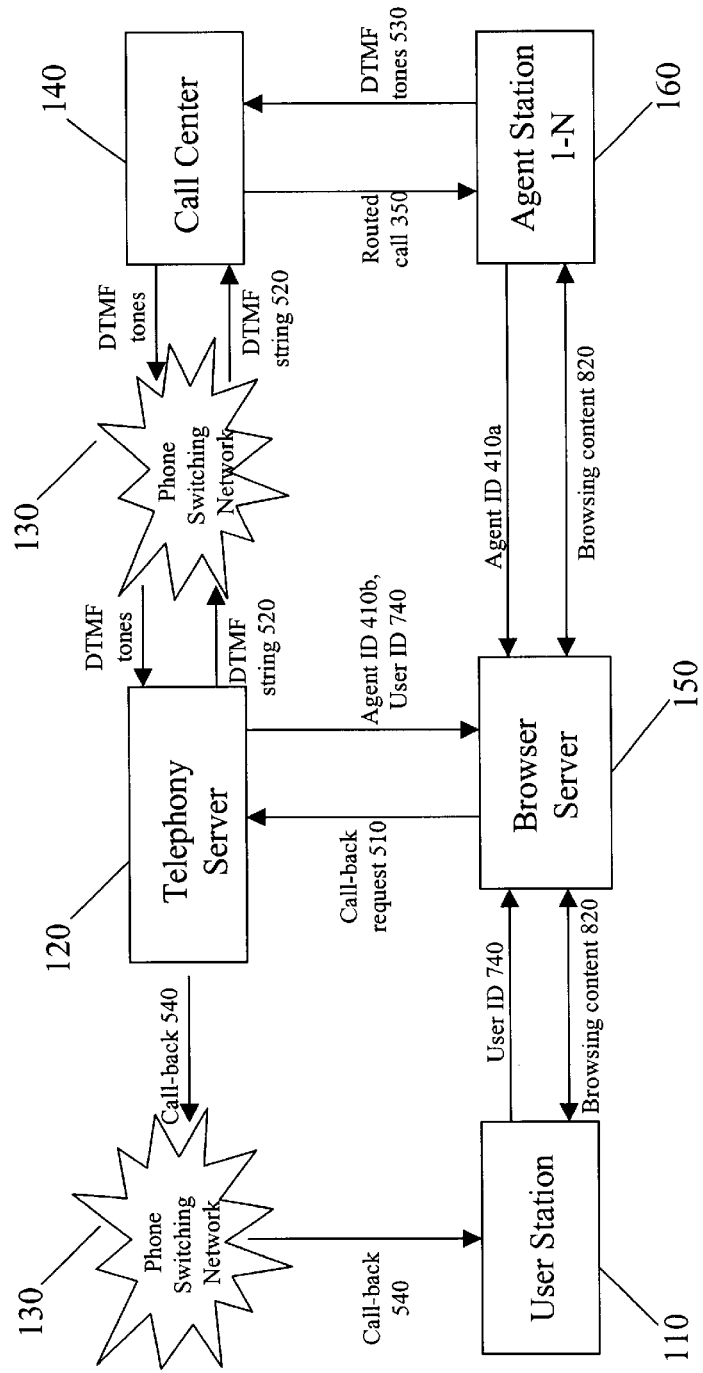
FIG. 8 is a high level block diagram with data flow for a system that facilitates live customer support based on co-browsing environment by matching a routed call with a workstation.

FIG. 8 is a block diagram of system 800, which is an extension of system 200 and in which the user station 110 and its connection to the system 200 are incorporated. In system 800, a user 710 at the user station 110 logs onto the browser serer 150 using user ID 740. The user ID and its corresponding browsing session are recorded in the browser server 150. On the other hand, an agent 310 at the agent station 160 may also independently log onto the browser server 150 using an agent ID 410*a* from a workstation 330. Similarly, the agent ID 410*a* and the corresponding browsing session opened by the browser server 150 for the agent are recorded in the browser server 150. These IDs (user ID 740 and agent ID 410*a*) and their corresponding browsing sessions may be independent of each other at this point.

When the user 710 browse on the web via the browser server 150, the user 710 may decide to get live customer support and subsequently issue a call-back request 510 through the browser server 150. The call-back request 510 may comprise different types of information. Examples of such different types include the user ID 740, a call-back phone number, the nature of the problem, and the account number. Through the connection between the browser server 150 and the Telephony server 120, the call-back request 510 is received by the Telephony server 120.

The Telephony server 120 connects the browser server 150 and the call center 140. The former handles web information and the latter handles phone calls. To bridge the two, the Telephony server 120 converts one type of information to the other. In handling the callback request 510, the Telephony server 120 encodes the call-back request into a DTMF string 520.

At the same time, to automatically place and bridge a call-back, the Telephony server 120 records certain information extracted from the call-back request 510. For example, the identification of the user who issues the call-back request 510 and the call-back phone number may be extracted from the request 510 and recorded in a queue of call-back requests, as a pair, in the Telephony server 120. Such a pair allows the Telephony server 120 to associate a callback with a customer. The user ID 740 may be used as the identification of the user who issues the call-back request 510.

The encoded call-back request, the DTMF string 520, is then transmitted from the Telephony server 120, via the phone switching network 130, to the call center 140. Based on the information encoded in the DTMF string 520 (e.g., call-back phone number, problem to be solved, customer account information), the call center 140 selects an appropriate agent 310 and places a routed call 350 to the agent 310 at the agent station 160.

When the agent 310 answers the routed call 350, the agent 310 enters a corresponding agent ID 410*b* via a touch-tone phone 320 at the agent station 160. This yields DTMF tones 530 that encodes the agent ID 410*b*. The DTMF tones 530 is sent to the call center 140 and then transmitted to the phone switching network 130. On the other side of the phone switching network 130, the Telephony server 120 detects the DTMF tones 530 so that it detects that there is an agent available to handle the call-back request.

The Telephony server 120 decodes the DTMF tones to extract the agent ID 410*b*, representing the agent 310. To connect the available agent 310 and the customer corresponding to the call-back request 510, the Telephony server 120 retrieves the information related to the call-back request 510, from its storage, where the call-back request and the corresponding user ID of the customer who issues the request are stored as a pair. The retrieved call-back request 510 includes a call-back phone number and the user ID 740.

Based on the retrieved call-back request 510 and its corresponding user ID 740, the Telephony server 120 automatically bridges a phone call-back 540 between the available agent 310 and the user 710 who issued the call-back request 510. The call-back 540 is placed according to the call-back phone number stored with the call-back request 510 in the Telephony server 120. At the same time, to facilitate a co-browsing session between the agent 310 and the user 710, the Telephony server 120 sends both the agent ID 410*b* and the user ID 740 to the browser server 150.

Upon receiving the user ID 740 and the agent ID 410*b* from the Telephony server 120, the browser server 150 matches the agent ID 410*b*, entered by agent 310 during answering the routed call 350, with a pre-stored agent ID 410*a*, entered by the same agent during a browsing session prior to answering the routed call 350. The browser server 150 then matches the user ID 740, sent from the Telephony server 120, with a pre-stored user ID, entered when the corresponding user logs onto the browser server 150.

Since the browser server 150 records both an ID and the browsing session associated with the ID, the match of the two agent IDs allows the browser server 150 to identify the corresponding workstation 330 and the browsing session of the agent 310 that runs on the workstation 330. Similarly, the match of the two user IDs allows the browser server 150 to identify the browsing session, running on, for example, the user's computer, of the user who issues the call-back request 510. The browser server 150 then connects the two browsing sessions and opens a co-browsing session, in which the agent 310 and the user 710 share the same web content 820 on their screen and each is able to push web content to the other.

Figure 9:
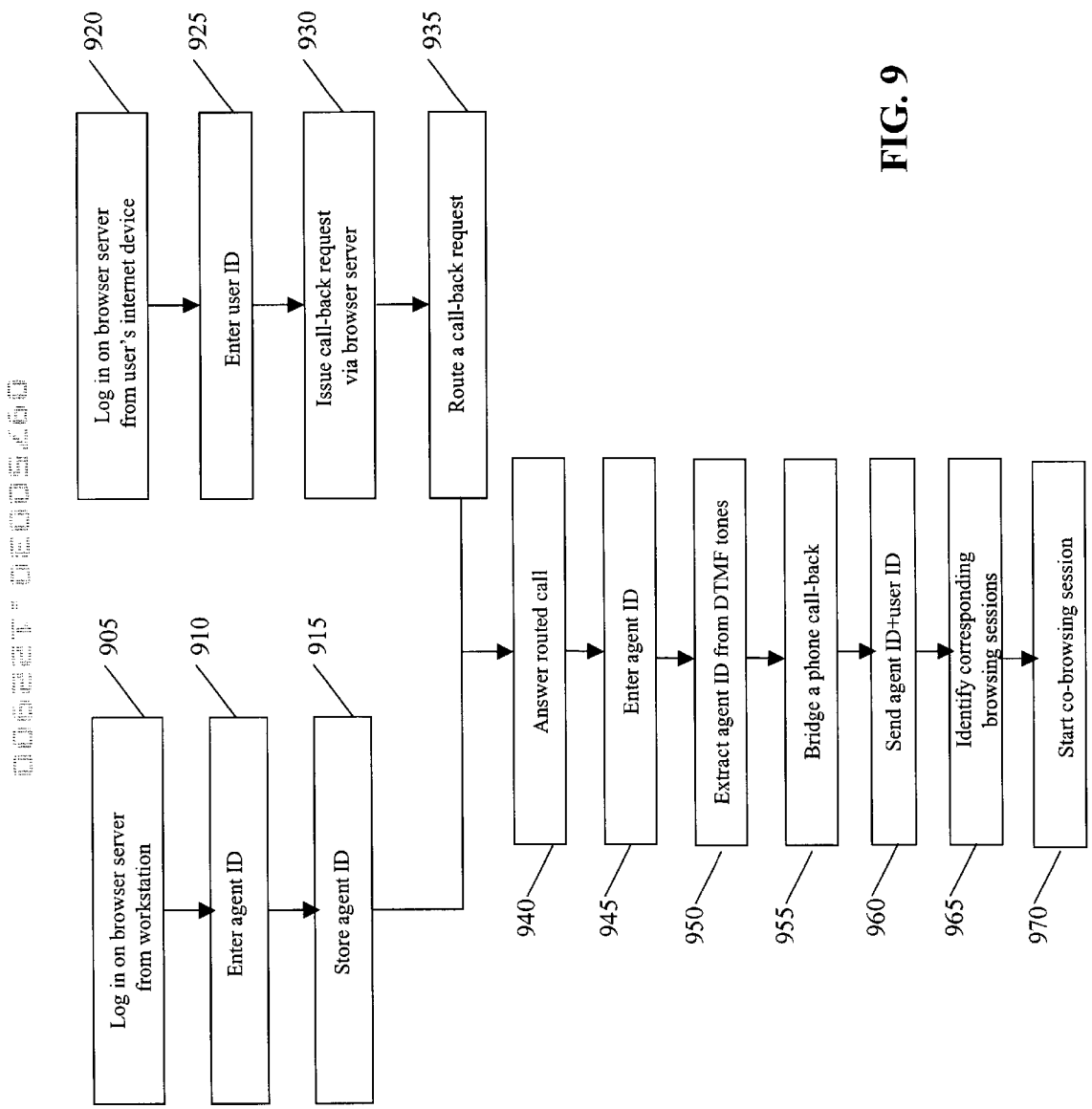
FIG. 9 is an exemplary flowchart for a system that facilitate live customer support by facilitating a co-browsing environment.

FIG. 9 is a flowchart explaining the operation of an exemplary system 800, in which live customer support may be enabled via both a phone call-back and a co-browsing session between a customer who requests the live customer support and an agent. An agent 310 logs onto the browser server 150 at act 905. The agent ID 410*a* is entered and stored at acts 910 and 915, respectively.

Independent of the agent 310, a user 710 logs onto the browser server 150 at act 920. The user ID 740 is entered and stored in the browser server 150 at act 925. The user 710 issues a call-back request 510 at act 930 from the browser server 150. The request is encoded, stored, and forwarded, by the Telephony server 120, to the call center 140. Based on the request, the call center 140 routes the request to a selected agent at act 935.

The selected agent 310 answers the routed call-back request at act 940. When answering the routed call, the agent 310 enters, at act 945, the corresponding agent ID 410*b* via a touch-tone phone, which is encoded as DTMF tones 530 and transmitted, via the call center 140, to the Telephony server 120. The agent ID 410*b* is extracted, at act 950, from the DTMF tones 530 by the Telephony server 120. The Telephony server 120 then, at act 955, automatically places a phone call-back 540 to the user who issues the call-back request and bridges the entire call session.

To enable a co-browsing session between the user 710 and the agent 310, the Telephony server 120 sends, at act 960, both the extracted agent ID 410*b* and the user ID 740 to the browser server 150. Upon receiving the agent ID 410*b* and the user ID 740, the browser server 150 identifies, at act 965, the corresponding browsing sessions of the user 710, the agent 310, as well as the associated workstation 330 of the agent 310. The co-browsing session is initiated by the browser server 150 at act 970.

Figure 10:
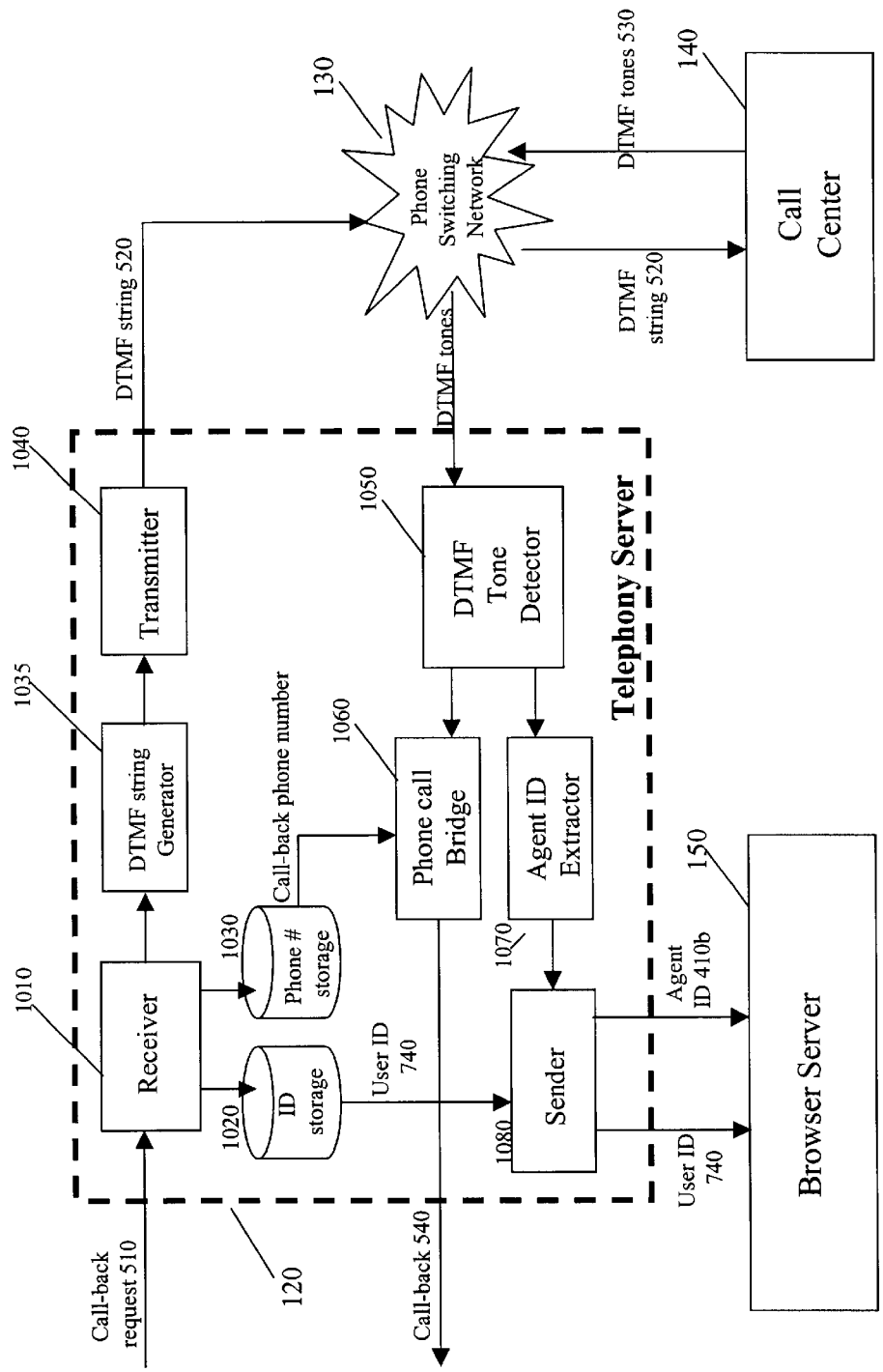
FIG. 10 is an expanded block diagram of a telephony server, which converts a web call-back request to a phone call and then facilitates both the call-back and a co-browsing environment.

FIG. 10 is an expanded block diagram of the Telephony server 120. In FIG. 10, the Telephony server 120 includes a receiver 1010, an ID storage 1020, a phone number storage 1030, a DTMF string generator 1035, a transmitter 1040, a DTMF tone detector 1050, a phone call bridge 1060, an agent ID extractor 1070, and a sender 1080. The receiver 1010 receives a call-back request 510, issued by the user 710 via a web page and sent from the browser server 150. The user ID 740 and the call-back phone number, contained in the callback request, are extracted and stored in the ID storage 1020 and the phone number storage 1030, respectively. In implementation, the ID storage 1020 and the phone number storage 1030 may physically be the same storage. The user ID 740 and the call-back phone number associated with a same call-back request are associated as such and may be retrieved together as a pair.

The DTMF string generator 1035 takes the call-back request 510, which may include other relevant customer information such as account number, and encodes it into a DTMF string 520. The encoded DTMF string 520 is then transmitted, by the transmitter 1040, to the call center 140, via the phone switching network 130. The Telephony server 120 then waits for DTMF tones, indicating that an available agent answers the call-back request 510.

The DTMF tone detector 1050 detects the DTMF tones 520, sent by the call center 140 which encodes an agent ID 410b entered by an agent 310 when the agent answers the call-back request 510, routed to the agent by the call center 140. The detected DTMF tones 530 is fed to the agent ID extractor 1070 to decode the DTMF tones so that the agent ID 410b may be extracted. At the same time, the phone call bridge 1060 retrieves information, from the phone number storage 1030 and the ID storage 1020, that is related to the call-back request 510 (e.g., the call-back phone number and the associated user ID 740). Based on the call-back phone number, the phone call bridge 1060 places a phone call-back 540 to the user 710 and bridges the entire session of the phone call-back. The sender 1080 retrieves the user ID 740 from the ID storage 1020 and sends it, with the extracted agent ID 410b, to the browser server 150 so that a co-browsing session between the agent 310 and the user 710 may be established.

Figure 11:
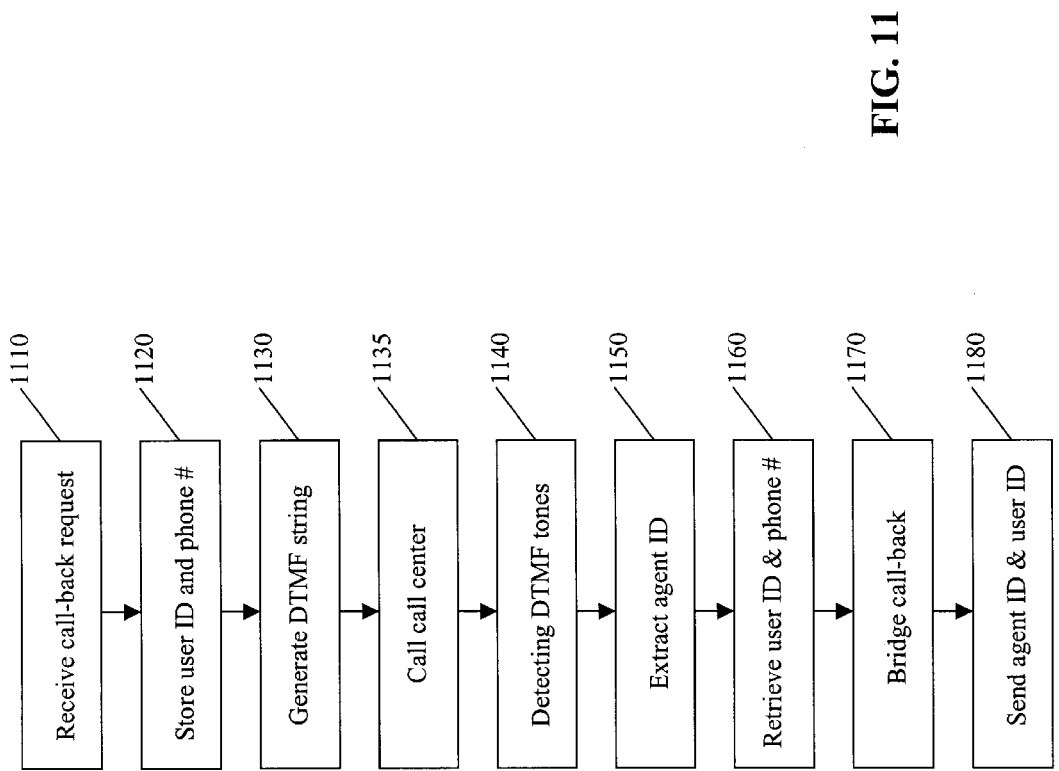
FIG. 11 is an exemplary flowchart for a telephony server.

FIG. 11 is a flowchart of an exemplary process for the Telephony server 120. A callback request 510 is received, at act 1110, by the Telephony server 120. The user ID 740 and the call-back phone number are stored, at act 1120, in the ID storage 1020 and the phone number storage 1030. The call-back request 510 is encoded into a DTMF string and sends, in the form of a phone call, at act 1130 to the call center 140. The Telephony server 120 then waits for DTMF tones.

When the Telephony server 120 detects, at act 1140, DTMF tones, it extracts the agent ID encoded in the DTMF tones. The user ID 740 and the call-back phone number are retrieved at act 1160. Based on the retrieved call-back phone number, the Telephony server 120 bridges a call-back 540 between the agent 310, represented by the agent ID, and the user 710, who issues the call-back request. The Telephony server 120 then sends both the user ID 740 and the agent ID 410b to the browser server 150.

Figure 12:
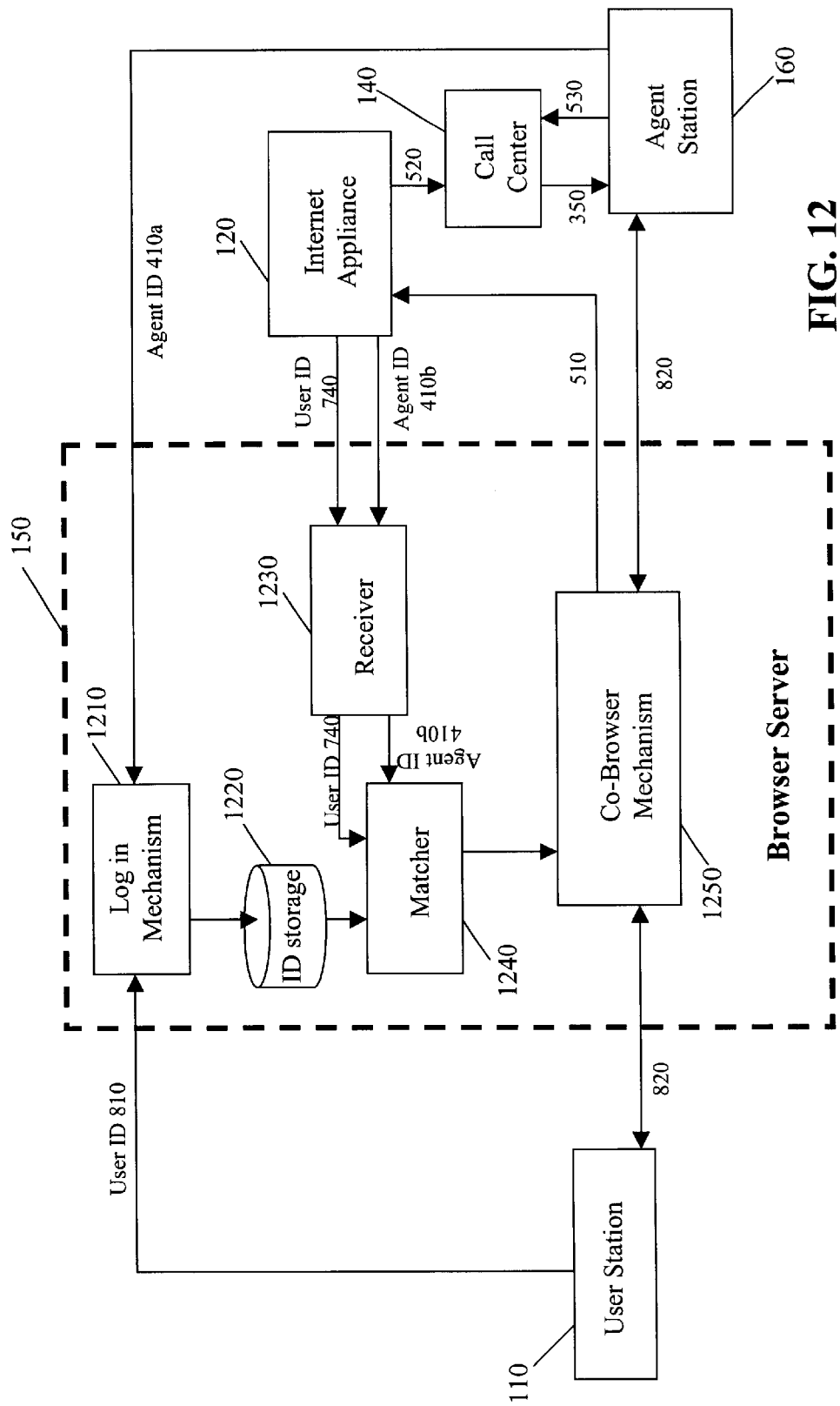
FIG. 12 is an expanded block diagram of a browser server, which supports a co-browsing environment for live customer support by matching an agent ID with an agent workstation.

FIG. 12 is a more detailed high level block diagram of the browser server 150, in relation to other parts of the system 800. In the exemplary diagram illustrated in FIG. 12, the browser server 150 includes a login mechanism 1210, an ID storage 1220, a receiver 1230, a matcher 1240, and a co-browser mechanism 1250.

The login mechanism 1210 allows a web user to login. A web user may be an agent working at an agent station, who supports live customer service. A web user may also be a customer who requests live customer service. When a web user logs onto the browser server 150, an ID may be required. When a web user is an agent, the agent may use the corresponding agent ID as a web user's ID. When a web user is a customer, the customer may use a user ID as a web user's ID.

Each web user, who logs on using an ID, may corresponds to a browsing session. For example, when an agent logs onto the browser server 150, the browser server 150 may open a browsing session for the agent. When a customer logs onto the browser server 150, the browser server 150 may open a different browsing session for the customer. Once a web user logs onto the browser server 150, the browser server 150 records the web user's ID and its associated browsing session in the ID storage 1220.

When an agent answers a routed call 350, representing a call-back request, DTMF tones 530, generated from the agent ID 410b (entered by the agent at the agent station 160), is sent to the Telephony server 120. The Telephony server 120 decodes the DTMF tones, extracting the agent ID 410b, retrieves the corresponding user ID, representing the customer who issued the call-back request, and sends the user ID 740 as well as the agent ID 410b to the browser server 150.

The receiver 1230 receives the user ID 740 and the agent ID 410b and forwards them to the matcher 1240. The matcher 1240 matches the user ID 740, identified from a call-back request 510, with a web user who has the same ID. The matcher 1240 also matches the agent ID 410b, extracted from the DTMF tones 530, with a web user who has the same ID. In this way, the matcher identifies two matching browsing sessions, one corresponding to the customer who issued the call-back request 510 and the other corresponding to the agent who answers the call-back request 510. The matcher 1240 then informs the co-browser mechanism 1250 about the matching sessions. The co-browser mechanism 1250 then establishes a co-browsing environment for the two matching browsing sessions so that the browsing content 820 may be shared between the two matching browsing sessions.

FIG. 13 is a flowchart of an exemplary process for the browser server 150. The login mechanism 1210 logs in a user (or a customer), at act 1310, with a user ID. The user ID is stored at act 1320 into the ID storage 1220. The login mechanism 1210 then logs in an agent, at act 1330, with an agent ID. The agent ID is stored at act 1340 into the ID storage 1220.

An agent ID and a user ID are received, at act 1350, and sent to the matcher 1240 by the receiver 1230. The matcher 1240 matches, at act 1360, the two given IDs with the IDs pre-stored by the login mechanism 1210 in the ID storage 1220. Through such matches, the matcher 1240 identifies, at act 1370, two browsing sessions corresponding to the given agent ID and the given user ID. When the co-browsing mechanism 1250 is informed of such identified browsing sessions, a co-browsing environment is established, at act 1380, between the agent, represented by the agent ID, and the user, represented by the user ID.

In the preferred embodiment, the telephone information service is a customer support center. However, this invention is not limited to customer support, but equally applicable to telephone services used for sales, pre-sales, information distribution and polling. While in the preferred embodiment described below, users of the system are customers, this invention equally applies to users who are employees, vendors, clients or potential future customers. The preferred embodiment also uses a web browser for the agent and customer, but the invention equally applies to other networked client applications.

The processing described above may be performed by a general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials, such as are within the scope of the appended claims.

What is claimed is:

1. A method comprising:
    entering, by an agent at an agent station, an agent ID when the agent answers a routed call, the routed call being associated with the agent ID;
    detecting, by a telephony server, DTMF tones resulted from the agent ID entered by the agent, the DTMF tones encoding the agent ID;
    sending, by the telephony server, the agent ID decoded from the DTMF tones to a browser server;
    matching, by the browser server, the agent ID, associated with the routed call, with a corresponding workstation that is represented by the agent ID;
    receiving, by the telephony server, a request for a call-back from a user, the request being received from the browser server via the Internet, the request including a type of the user's problem;
    placing, by the telephony server, a call to a call center, the call representing the request; and
    routing, by the call center, the call to a selected agent station, from a plurality of agent stations, based on the type of the user's problem, as a routed call before the agent answers the routed call.

2. The method according to claim 1, further comprising:
    entering, by the agent before the agent answers the routed call, the agent ID into the browser server from the workstation; and
    recording, by the browser server, the agent ID entered by the agent into the browser server from the workstation.

3. The method according to claim 2, wherein the matching comprises:
    receiving, by the browser server, the agent ID decoded from the DTMF tones, sent by the sending from the telephony server; and
    identifying, by the browser server, the corresponding workstation by matching the agent ID of the corresponding workstation, recorded by the recording before the agent answers the routed call, with the agent ID decoded from the DTMF tones, received by the receiving.

4. The method according to claim 3, further comprising:
    issuing, by the user, the request for the call-back, by selecting a live information service from a web page via a browser on the browser server, from a device.

5. The method according to claim 4, wherein the device comprises a personal computer.

6. The method according to claim 4, wherein the device comprises a personal digital assistant.

7. The method according to claim 4, wherein the device comprises a wireless personal digital assistant.

8. The method according to claim 4, wherein the device comprises a wireless web-enabled device.

9. The method according to claim 4, further comprising:
    bridging, by the telephony server after the agent answers the routed call, a call-back between the agent and the user; and
    opening, by the browser server, a co-browsing session between the user and the agent by displaying similar web content on both display screens of the device and the corresponding workstation.

10. A system for matching routed call to agent workstation, the system comprising:
    a browser server;
    an agent station wherein the agent station including a workstation and a call station, the workstation being used by an agent to log into the browser server using an agent ID and the call station being used by the agent to answer a routed call;
    a device used by a user, the user connecting to the browser server to access data content via the device;
    a telephony server connecting to the browser server and the device, the telephony server
        receiving a request for a call-back issued by the user, the request including a type of the user's problem,
        detecting an agent ID entered by the agent when the agent answers the routed call to initiate the call-back, sending the agent ID to the browser server,
    and bridging the call-back; and
    a call center connecting to the telephony server and the agent station, the call center receiving the request for the call-back issued by the user and forwarded by the telephony server, and routing the request to a selected agent station, from a plurality of agent stations, based on the type of the user's problem, as a routed call.

11. The system according to claim 10 wherein the request for a call-back is issued by the user from a web page hosted by the browser server.

12. The system according to claim 11, wherein the device comprises a personal computer.

13. The system according to claim 11, wherein the device comprises a personal digital assistant.

14. The system according to claim 11, wherein the device comprises a wireless web-enabled device.

15. A system for a telephony server, the system comprising:
    a receiver for receiving a request from a user for a call-back, the request including a type of the user's problem;
    a call center to call a selected agent station, from a plurality of agent stations, based on a type of the user's problem, as a routed call before the agent answers the routed call;
    a dialer for placing a call to the call center based on the request, the request including the type of the user's problem;
    a detector for detecting DTMF tones generated from a DTMF key entered by an agent at an agent station, the DTMF key representing the agent ID of the agent and DTMF tones encoding the agent ID;
    a transmitter for sending the agent ID, decoded from DTMF tones, to the browser server; and
    a phone call bridge for placing and bridging the call-back between the agent and the user.

16. The system according to claim 15 wherein the request for the call-back is issued via a web page on a browser hosted by a browser server.

17. A system for a browser server, the system comprising:
a log-in mechanism for a logging in session, wherein the log-in in session corresponds to an agent ID;
a telephony server connecting to the browser server and a device, the telephony server
receiving a request for a call-back issued by a user, the request including a type of the user's problem,
detecting an agent ID entered by the agent when the agent answers a routed call to initiate the call-back,
sending the agent ID to the browser server, and
bridging the call-back; and
a call center connecting to the telephony server and the agent station, the call center receiving the request for the call-back issued by the user and forwarded by the telephony server, routing the request to a selected agent station, from a plurality of agent stations, based on the type of the user's problem, as the routed call;
a receiver for receiving an ID from the telephony server;
a matcher for matching the agent ID corresponding to a log-in session and the ID received from the telephony server by the receiver;
a co-browsing mechanism; and
a web server.

18. The system according to claim 17, further comprising a storage to store IDs.

19. A computer readable medium having program code stored thereon such that when the code is read and executed by a computer, the computer is caused to:
detect, by a telephony server, DTMF tones resulted from an agent ID entered by an agent when the agent answers a routed call, the DTMF tones encoding the agent ID, the routed call being associated with the agent ID;
send, by the telephony server, the agent ID decoded from the DTMF tones to a browser server; and
match, by the browser server, the agent ID, associated with the routed call, with a corresponding workstation that is represented by the agent ID
receive, by the telephony server, a request for a call-back from a user, the request being received from the browser server via the Internet, and the request includes a type of the user's problem;
placing, by the telephony server, a call to a call center, the call representing the request; and
routing, by the call center, the call to a selected agent station, from a plurality of agent stations, based on the type of the user's problem, as a routed call before the agent answers the routed call.

20. The medium according to claim 19, wherein the code further causes the computer to:
log in the agent, before the agent answers the routed call, based on the agent ID when the agent logs into the browser server from the workstation; and
record, by the browser server, the agent ID used by the agent to log into the browser server from the workstation.

21. The medium according to claim 19, wherein the code further causes the computer to:
receive, by the browser server, the agent ID decoded from the DTMF tones, sent by the sending from the telephony server; and
identify, by the browser server, the corresponding workstation by matching the agent ID of the corresponding workstation, recorded by the recording before the agent answers the routed call, with the agent ID decoded from the DTMF tones, received by the receiving.

22. The medium according to claim 19, wherein the code further causes the computer to:
receives the request from the user, for the call-back, the user issuing the request by selecting a live telephone information service from a web page via a browser on the browser server, from a device.

23. The medium according to claim 19, wherein the code further causes the computer to:
bridge, by the telephony server after the agent answers the routed call, a call-back between the agent and the user; and
open, by the browser server, a co-browsing session between the user and the agent by displaying the same web content on both display screens of the device and the corresponding workstation.

24. The method according to claim 1, wherein the type of the user's problem is billing-related.

25. The method according to claim 1, wherein the agent enters the agent ID every time the agent answers the routed call.

26. The system according to claim 9, wherein the type of the user's problem is billing-related.

27. The system according to claim 9, wherein the agent enters the agent ID every time the agent answers the routed call.

28. The system according to claim 15, wherein the type of the user's problem is billing-related.

29. The system according to claim 15, wherein the agent enters the agent ID every time the agent answers the routed call.

30. The method according to claim 17, wherein the type of the user's problem is billing-related.

31. The system according to claim 17, wherein the agent enters the agent ID every time the agent answers the routed call.

32. The medium according to claim 19, wherein the type of the user's problem is billing-related.

33. The medium according to claim 19, wherein the agent enters the agent ID every time the agent answers the routed call.

* * * * *